United States Patent [19]

Green

[11] Patent Number: 5,763,047

[45] Date of Patent: Jun. 9, 1998

[54] BLOWN-FILM TEXTURED LINER HAVING A SMOOTH WELDING STRIP

[75] Inventor: Jimmy D. Green, Grand Prairie, Tex.

[73] Assignee: Olympic General Corporation, Reno, Nev.

[21] Appl. No.: 625,696

[22] Filed: Apr. 3, 1996

[51] Int. Cl.[6] .................. F02D 29/00; B32B 3/02
[52] U.S. Cl. .................. 428/141; 428/77; 428/192; 428/189; 428/213; 428/523; 428/81; 405/129; 405/274; 405/279
[58] Field of Search .................. 428/141, 77, 192, 428/189, 213, 523, 81; 405/129, 274, 279

[56] References Cited

U.S. PATENT DOCUMENTS

| | | | |
|---|---|---|---|
| 3,448,183 | 6/1969 | Chisholm | 264/37 |
| 3,761,211 | 9/1973 | Parkinson | 425/131 |
| 4,488,918 | 12/1984 | Joys | 156/79 |
| 4,533,308 | 8/1985 | Cloeren | 425/131.1 |
| 4,533,510 | 8/1985 | Nissel | 264/171 |
| 4,756,858 | 7/1988 | Reifehauser et al. | 264/37 |
| 4,885,201 | 12/1989 | Brandt | 428/143 |
| 4,965,097 | 10/1990 | Bach | 428/194 |
| 5,127,260 | 7/1992 | Robertson | 73/37 |
| 5,137,393 | 8/1992 | Fuhr et al. | 405/129 |
| 5,147,195 | 9/1992 | Cloeren | 425/141 |
| 5,206,067 | 4/1993 | Bonzo | 428/119 |
| 5,211,898 | 5/1993 | Shinmoto | 264/171 |
| 5,258,217 | 11/1993 | Lewis | 428/120 |
| 5,350,255 | 9/1994 | Carriker | 405/270 |
| 5,401,118 | 3/1995 | Kramer | 405/129 |
| 5,403,126 | 4/1995 | Carriker et al. | 405/270 |
| 5,540,985 | 7/1996 | Kennedy, Jr. | 428/282 |

Primary Examiner—William Watkins
Attorney, Agent, or Firm—George R. Schultz; Strasburger & Price

[57] ABSTRACT

A blown-film textured liner having a textured surface to provide improved soil gripping properties and smooth untextured edges for improving the integrity of the joint between adjacent liner sheets. The textured liner can be used to protect soil from waste products.

7 Claims, 3 Drawing Sheets

5,763,047

BLOWN-FILM TEXTURED LINER HAVING A SMOOTH WELDING STRIP

BACKGROUND OF THE INVENTION

1. Field of the Invention

The present invention relates to a blown-film textured liner for protecting soil from waste products. More particularly, the blown-film textured liner has a textured surface to provide improved soil gripping properties and smooth untextured edges for improving the integrity of the joint between adjacent liner sheets.

2. Description of the Related Art

In the past, various techniques have been employed for forming films having textured surfaces. One such technique was to provide one of both surfaces of the film with recesses and projections by emboss molding of the film. This technique is disadvantageous because it damages the integrity of the film. Such films would not be suitable for use as a blown-film textured liner due to the risk of failure of the film and the consequent leaching of potentially hazardous materials into the underlying soil.

Another technique for forming textured films is disclosed in U.S. Pat. No. 4,885,201. According to this technique, the film is heated to a welding temperature and particles also heated to the welding temperature are thrown against or sprayed on the film surface. This technique is also disadvantageous because once a shear stress limit is exerted on the particles welded to the film, the particles detach from the film.

A further technique for forming a textured film is disclosed in U.S. Pat. No. 5,403,126. According to this technique, a fluted roller is mounted over a bath containing liquified friction enhancing material. The fluted roller is dipped in the liquid friction enhancing material and thereafter engages the lower surface of the film thereby depositing parallel rows of friction enhancing material on the lower surface of the film.

U.S. Pat. No. 5,258,217 discloses a complex structure landfill liner that includes a plurality of pointed soil gripping protrusions. Adjacent sheets of the landfill liner are joined in a face-to-face relationship.

U.S. Pat. No. 4,488,918 discloses a plastic film having a non-slip surface that includes spaced random patterns of rigid peaks and ridges. The peaks and ridges are formed by a second thermoplastic layer coextruded with and bonded to the plastic film that is ruptured during expansion of the coextruded materials.

A need exists, therefore, for a blown-film textured liner that is textured so as to reduce slippage of the liner loaded with waste material that also includes an improved means for joining adjacent sheets to ensure the integrity of the joint.

SUMMARY OF THE INVENTION

The method and apparatus of the present invention overcome the above-mentioned disadvantages and drawbacks which are characteristic of the related art.

According to the apparatus of the present invention, the blown-film textured liner includes a textured portion and a smooth portion. The textured portion of the liner insures that the sheet will remain in place, especially on sloped surfaces. The smooth portion is adapted to be overlaid on the smooth portion of an adjoining sheet to facilitate the connection of adjoining sheets by welding. The process for manufacturing the liners can be modified to create a smooth portion on both sides of the sheet. The elimination of texture along the smooth band of the blown-film textured liner improves the integrity of the joint between adjacent liners.

The method of the present invention for producing the inventive blown-film textured liner may be carried out using a blown-film extrusion technique for producing a three-layer product. According to the method of the present invention the outer textured layers include a blowing agent that erupts during extrusion to create the texture. A plug is strategically located within the extrusion passage for the textured layers to prevent the extrusion of material in the area intended to yield a smooth surface. In effect, the smooth surface areas comprise only the center layer with no textured layer disposed thereon.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings.

DESCRIPTION OF THE PREFERRED EMBODIMENTS

Figure 1:
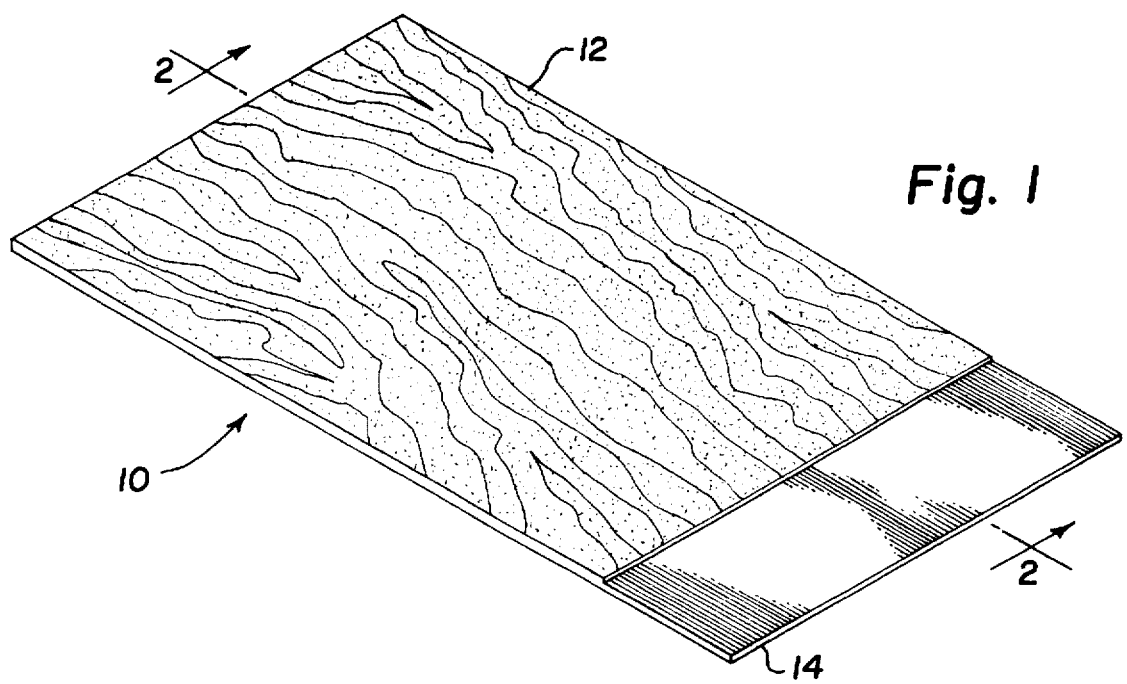
FIG. 1 is a perspective view of a preferred embodiment of a portion of the blown-film textured liner of the present invention.
Figure 2A:
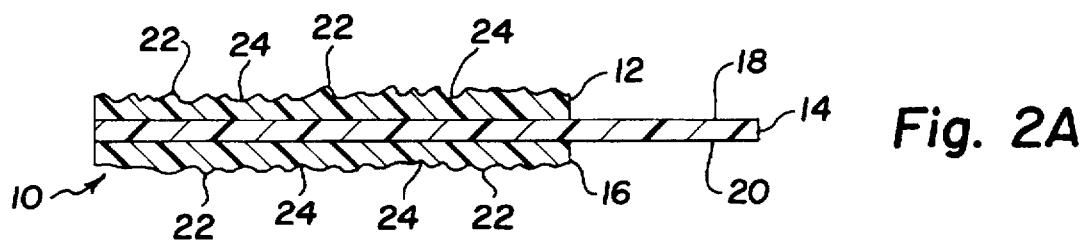
FIG. 2A is an enlarged cross-sectional view of the blown-film textured liner shown in FIG. 1 taken along line 1—1.
Figure 2B:
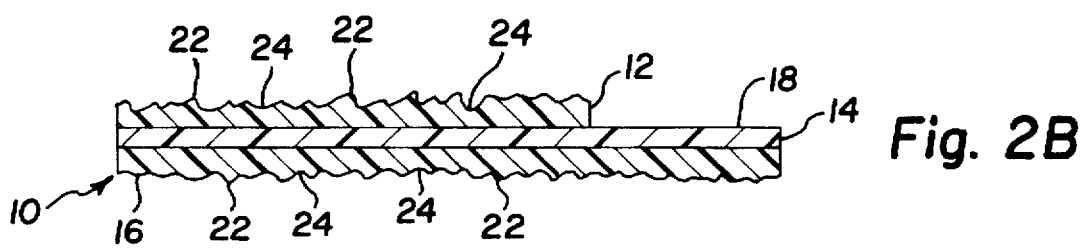
FIG. 2B is an enlarged cross-sectional view of an alternate embodiment of the blown-film textured liner shown in FIG. 1 taken along line 1—1.

Referring now to the drawings, and particularly to FIGS. 1 and 2A-B, a preferred embodiment of the blown-film textured liner of the present invention is shown and generally designated by the reference numeral 10.

The blown-film textured liner 10 includes a textured top layer 12, a middle layer 14 and a textured bottom layer 16. As shown in FIG. 2A, the textured top layer 12 and the textured bottom layer 16 are not coextensive with the blown-film textured liner 10 so that an upper portion 18 and a lower portion 20 of the middle layer 14 are exposed. According to a preferred embodiment of the present invention, and as shown in FIG. 2B, the bottom layer 16 is coextensive with the blown-film textured liner 10 and completely covers the middle layer 14 so no portion of the lower portion of the middle layer 14 is exposed.

The textured top layer 12 and the textured bottom layer 16 are characterized by a random distribution of peaks 22 and valleys 24. Preferably, the top layer 12, the middle layer 14 and the bottom layer 16 are all formed from suitable thermoplastic materials such as high density polyethylene, linear low density polyethylene or very low density polyethylene. Those of ordinary skill in the art will recognize, however, that many other suitable thermoplastic materials such as elastomeric polypropylene may be utilized to form the blown-film textured liner 10 of the present invention. Typical thicknesses for the blown-film textured liner 10 of the present invention are from 20 to 100 mil. Typical properties for blown-film textured liner sheets 10 formed of high density polyethylene and linear low density polyethylene are shown in Tables 1 and 2.

According to a preferred method of the present invention, the blown-film textured liner 10 is manufactured by a continuous blown-film process. According to conventional steps of a continuous The material gauge is monitored and maintained by a computer system which controls the operation of the extruder.

At the top of the tower, the bubble passes through a collapsing frame and is pulled through the nip rollers. The material is directed back toward the ground and continues cooling as it approaches a winding machine. Before being

TABLE 1

| Property | Test Method | Nominal Values | | | Minimum Values | | |
|---|---|---|---|---|---|---|---|
| | | 40 Mil | 60 Mil | 80 Mil | 40 Mil | 60 Mil | 80 Mil |
| Thickness, mils | ASTM D 1593 | 40 | 60 | 80 | 36 | 54 | 72 |
| Sheet Density, g/cc | ASTM D 1505 | 0.95 | 0.95 | 0.95 | 0.940 | 0.940 | 0.940 |
| Melt Index, g/10 minutes | ASTM D 1238 | 0.3 | 0.3 | 0.3 | 0.40 (max.) | 0.40 (max.) | 0.40 (max.) |
| Carbon Black Content, % | ASTM D 1603 | 2.5 | 2.5 | 2.5 | 2–3 | 2–3 | 2–3 |
| Carbon Black Dispersion | ASTM D 3015 | A2 | A2 | A2 | A1, A2, B1 | A1, A2, B1 | A1, A2, B1 |
| Tensile Properties | ASTM D 638 | | | | | | |
| 1. Tensile Strength at Yield, ppi | (Mod. per NSF Std. 54) | 100 | 140 | 180 | 90 | 126 | 160 |
| 2. Elongation at Yield, % | | 15 | 15 | 15 | 13 | 13 | 13 |
| 3. Tensile Strength at Break, ppi | | 95 | 135 | 175 | 80 | 100 | 155 |
| 4. Elongation at Break (2.0° G.L.) % | | 350 | 350 | 350 | 200 | 200 | 200 |
| Tear Strength, lbs. | ASTM D 1004 | 32 | 45 | 60 | 30 | 42 | 52 |
| Puncture Resistance, lbs. | FTMS 101-2065 | 62 | 85 | 115 | 55 | 75 | 95 |
| | ASTM D 4833 | 85 | 110 | 145 | 80 | 95 | 120 |
| Low Temperature Brittleness | ASTM D 746 | <–112° F. | <–112° F. | <–112° F. | <–94° F. | <–94° F. | <–94° F. |
| Environmental Stress Crack Resistance, hours | ASTM D 1693 (Cond. B) | 2,000+ | 2,000+ | 2,000+ | 2,000 | 2,000 | 2,000 |
| Dimensional Stability, % | ASTM D 1204 | +/–0.5 | +/–0.5 | +/–0.5 | +/–1 | +/–1 | +/–1 |

TABLE 2

| Property | Test Method | Nominal Values | | Minimum Values | |
|---|---|---|---|---|---|
| | | 40 Mil | 60 Mil | 40 Mil | 60 Mil |
| Thickness, mils | ASTM D 1593 | 40 | 60 | 36 | 54 |
| Resin Density, g/cc | ASTM D 1505 | 0.92 | 0.92 | 0.915 | 0.915 |
| Melt Index, g/10 minutes | ASTM D 1238 | 0.2 | 0.2 | 0.60 (max.) | 0.60 (max.) |
| Carbon Black Content, % | ASTM D 1603 | 2.5 | 2.5 | 2–3 | 2–3 |
| Carbon Black Dispersion | ASTM D 3015 | A2 | A2 | A1, A2, B1 | A1, A2, B1 |
| Tensile Properties | ASTM D 638 | | | | |
| 1. Tensile Strength at Yield, ppi | (Mod. per NSF Std. 54) | 76 | 100 | 60 | 90 |
| 2. Elongation at Yield, % | | 18 | 18 | 13 | 13 |
| 3. Tensile Strength at Break, ppi | | 90 | 126 | 72 | 95 |
| 4. Elongation at Break (2.0° G.L.) % | | 450 | 450 | 300 | 300 |
| Tear Strength, lbs. | ASTM D 1004 | 28 | 40 | 23 | 34 |
| Puncture Resistance, lbs. | FTMS 101-2065 | 58 | 78 | 48 | 70 |
| | ASTM D 4833 | 76 | 107 | 54 | 81 |
| Low Temperature Brittleness | ASTM D 746 | <–112° F. | <–112° F. | <–94° F. | <–94° F. |
| Environmental Stress Crack Resistance, hours | ASTM D 1693 (Cond. B) | 2,000+ | 2,000+ | 2,000 | 2,000 |
| Dimensional Stability, % | ASTM D 1204 | +/–1 | +/–1 | +/–3 | +/–3 | blown-film process, polyethylene resin is fed into an extruder. The resin is heated to its melting point in the extruder barrel. It is conveyed through the barrel by the rotation of a screw, which which, in conjunction with heating elements along the barrel, provides consistency to produce a molten polymer stream.

The molten material is forced through a screen pack, which acts as a final filter for impurities and contaminants, and up through a blown-film extrusion die. The material extrudes from the circular die as a blown-film tube (bubble) and is pulled vertically by a set of nip rollers located at the top of a cooling tower. An internal bubble cooling unit which is part of the extruder maintains consistent bubble diameter.

taken up by the winding machine, the tube is split and spread to its deployable width. The winder rolls the finished blown-film textured liner onto a heavy-duty core.

Figure 3:
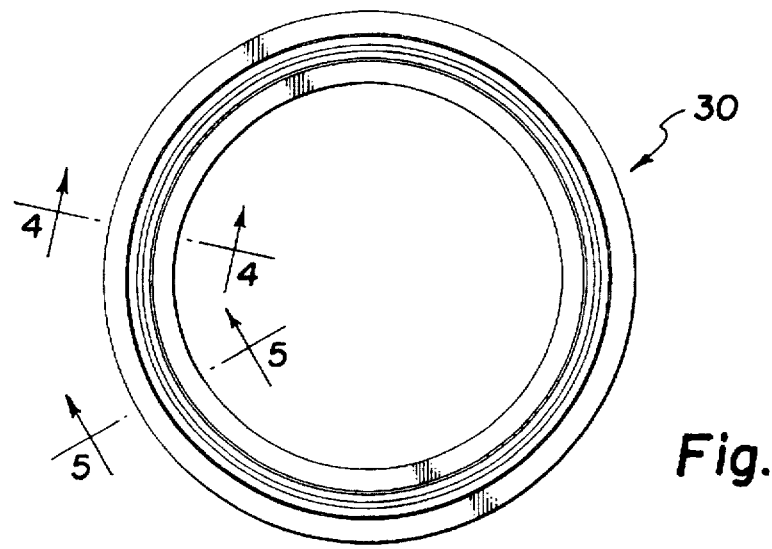
FIG. 3 is a top view of an blown-film extrusion die for forming the blown-film textured liner of FIG. 1.
Figure 4:
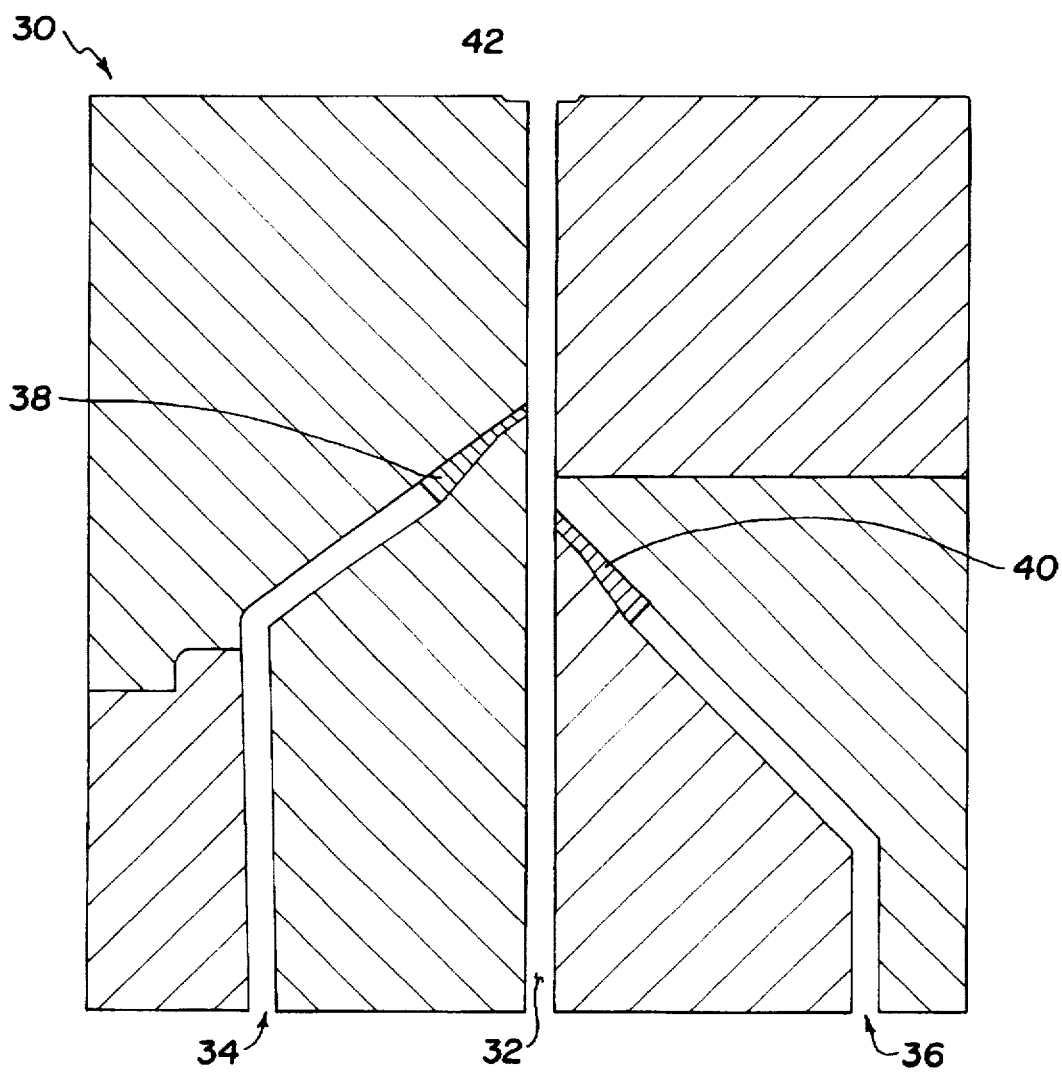
FIG. 4 is a cross-sectional view of the blown-film extrusion die shown in FIG. 3 taken along line 4—4.
Figure 5:
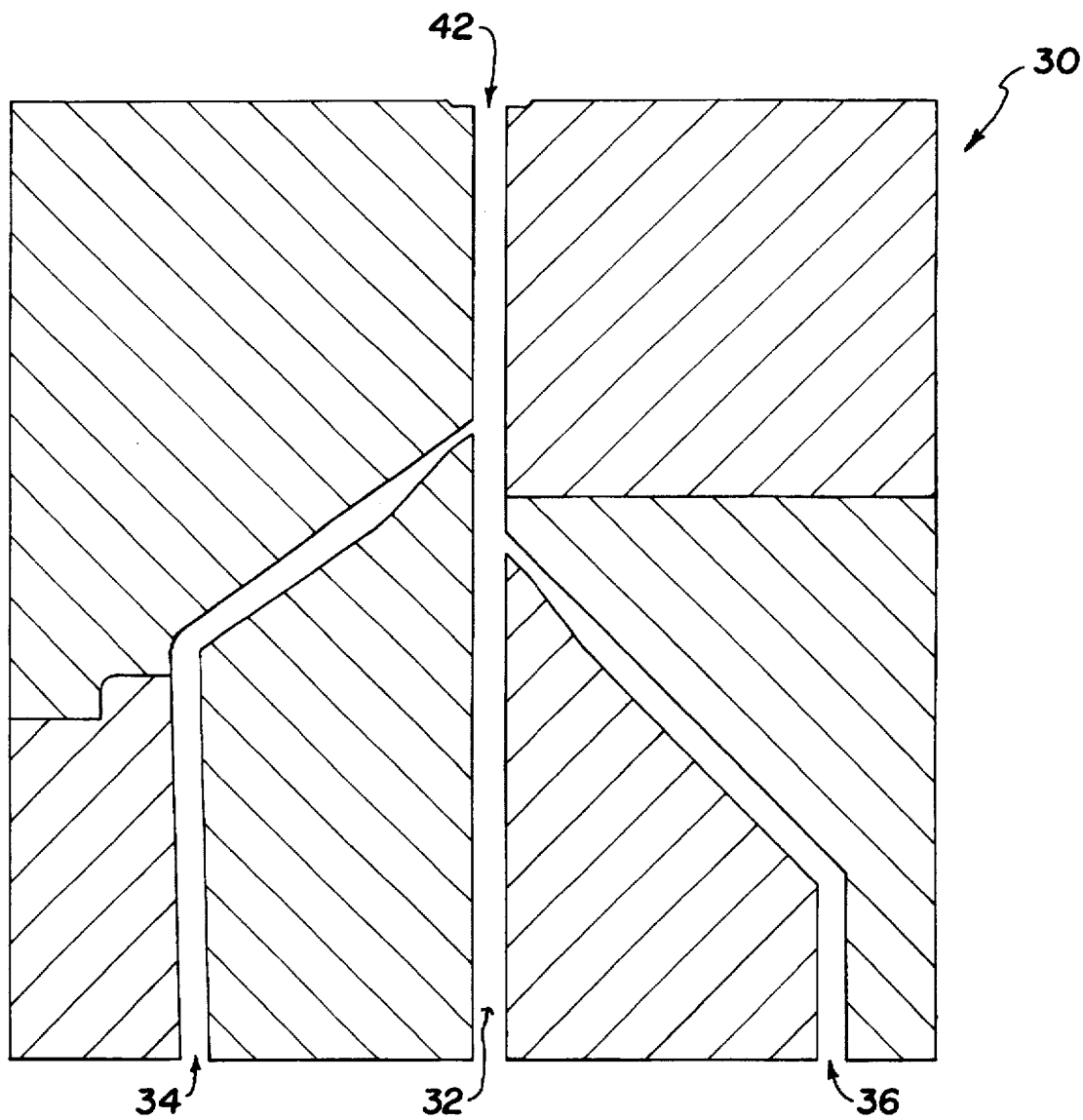
FIG. 5 is a cross-sectional view of the blown-film extrusion die shown in FIG. 3 taken along line 5—5.

According to the method of the present invention, the molten thermoplastic resin is extruded according to conventional blown-film extrusion techniques such as disclosed in U.S. Pat. Nos. 3,448,183, 3,761,211, 4,533,308, 4,533,510, 4,756,858, 5,147,195 and 5,211,898, the entire disclosures of which are incorporated herein by reference, through a blown-film extrusion die 30 as shown in FIGS. 3–5. As shown best in FIGS. 4 and 5, blown-film extrusion die 30 includes a central passage 32 and side passages 34 and 36. The middle layer 14 of the blown-film textured liner 10 is formed by the molten thermoplastic material extruded through central passage 32 while the top layer 12 and the bottom layer 16 of the blown-film textured liner 10 are formed by the molten thermoplastic material extruded through the side passages 34 and 36.

As shown in FIG. 4, when it is desired to block the flow of the thermoplastic material in one or both of the side passages 34 and 36 to create the exposed portion of the middle layer 14, a plug 38 is placed at the juncture of the side passage 34 and the central passage 32 and a plug 40 is placed at the juncture of the side passage 36 and the central passage 32. Preferably, the plugs 38 and 40 are made of a material that will not thermally degrade and will not extrude out of the side passages 34 and 36, such as brass, aluminum, lead, polyimides such as Duratron 400® which is commercially available from Polymer Corporation and polybenzimidazoles such as Celazole PBI® which is commercially available from Polymer Corporation. The respective plugs 38 and 40 block the flow of the thermoplastic material through the side passages 34 and 36, respectively. The radial width of the plugs 38 and 40 determine the width of the exposed portions of the middle layer 14. It will be recognized that if it is desired to create an exposed portion of the middle layer 14 on only one side of the blown-film textured liner 10, then only one of the plugs 38 and 40 will be placed in the side passages 34 and 36 of the blown-film extrusion die 30.

As shown in FIG. 5, at the location on the blown-film textured liner 10 where it is desired to extrude the textured top layer 12 and the textured bottom layer 16 onto the middle layer 14, the flow of molten thermoplastic material through the side passages 34 and 36 is not blocked by a plug. In such case, the molten thermoplastic material in the side passages 34 and 36 merges with and becomes welded to the thermoplastic material disposed in passage 32 with a sufficient bond prior to emergence from an orifice 42 in the blown-film extrusion die to form the three layer composite structure shown in FIGS. 1 and 2.

The molten thermoplastic material extruded through the side passages 34 and 36 includes a blowing agent, preferably citric acid, sodium bicarbonate or nitrogen, so that the blowing agent erupts during its passage through the side passages 34 and 36 of the blown-film extrusion die 30 so that upon emergence from the orifice of the blown-film extrusion die 30 the top layer 12 and the bottom layer 16 are ruptured to form the textured surface thereof as shown in FIGS. 1 and 2A-B.

When the blown-film textured liner is used as a landfill liner, rolls of the blown-film textured liner 10 are deployed in the field preferably using a spreader bar assembly attached to a loader bucket or by other appropriate methods well known to those of ordinary skill in the art. Adjacent sheets of the blown-film textured liner 10 may be joined by either hot shoe fusion or extrusion welding processes. On sloped surfaces, the seams of the blown-film textured liners 10 are preferably oriented in the general direction of maximum slope so that the seams are oriented down rather than across the slope. The adjoining sheets preferably have a finished minimum overlap of four inches for hot shoe fusion welding and three inches for extrusion welding. In an extrusion welding process, the welding rod preferably has the same properties as the resin used to manufacture the blown-film textured liner 10.

Hot wedge welding is the preferred seaming method for adjoining adjacent sheets of the blown-film textured liner 10. The hot wedge system produces a bonded seam by running a hot metal wedge between the overlapped area of the adjacent sheets of the blown-film textured liner 10. The hot wedge melts the facing surfaces of the two liners and creates a permanent bond between them using controlled heat and pressure. The wedge is square at the leading end and tapered at the trailing end. The heated overlapping portions of the blown-film textured liner 10 come together at the tapered end of the hot wedge under pressure from two nip/drive rollers, and are permanently fused together. The temperature settings of the hot wedge will vary according to the grade of polyethylene used for the blown-film textured liner 10. Typical wedge temperature ranges for hot wedge seaming for high density polyethylene are from 600° to 752° F. and for linear low density polyethylene are from 600° to 716° F. The lower end of the temperature ranges is typically used in dry, warm weather seaming conditions while the upper end of the temperature ranges is typically used in damp, cold weather seaming conditions.

The overlapping portions of the adjacent blown-film textured liner sheets 10 preferably comprise the exposed portions of the middle layer 14. According to the ASTM D 4437 (Modified per NSF standard 54) test method, the seams formed from such overlapped smooth portions have the properties shown in Table 3.

TABLE 3

| SEAM PROPERTIES | | | | | | |
|---|---|---|---|---|---|---|
| | 20 Mil | 30 Mil | 40 Mil | 60 Mil | 80 Mil | 100 Mil |
| High Density Polyethylene | | | | | | |
| Shear strength, ppi | 44 | 66 | 87 | 131 | 175 | 218 |
| Peel srength, ppi | 29 | 43 | 57 | 86 | 114 | 143 |
| Linear Low Density Polyethylene | | | | | | |
| Shear strength, ppi | | 45 | 60 | 90 | | |
| Peel strength, ppi | | 37 | 50 | 75 | | |

Extrusion fillet welding preferably may used for patches around details such as pipes and sumps. An extrusion weld is produced by using a 3, 4 or 5 mm diameter welding rod. The welding rod is applied as a "welded bead" at the edge of two overlapped blown-film textured liner sheets 10, resulting in an extrusion seam. The welding rod is extruded and deposited along the overlapped seam of the blown-film textured liner sheets 10 to provide the extrusion fillet welding seam.

Those of ordinary skill in the art will recognize that the blown-film textured liner of the present invention has many uses in addition to landfill liners such as landfill caps, Newtonian fluid reservoir liners, canal liners, retaining wall liners and hazardous waste containment.

While preferred embodiments of the invention have been shown and described, it will be understood by persons skilled in the art that various changes and modifications may be made without departing from the spirit and scope of the invention which is defined by the following claims.

What is claimed is:

1. A blown-film textured liner, comprising:
   a) a first layer of thermoplastic material having an upper flat surface and a lower flat surface;
   b) a second layer of thermoplastic material bonded to said upper flat surface of said first layer of thermoplastic material, said second layer of thermoplastic material comprising a random distribution of peaks and valleys, wherein said second layer is not coextensive with said first layer; and c) a third layer of thermoplastic material bonded to said lower flat surface of said first layer of thermoplastic material, said third layer of thermoplastic material comprising a random distribution of peaks and valleys.

2. A blown-film textured liner according to claim 1, wherein said third layer is coextensive with said first layer.

3. A blown-film textured liner according to claim 1, wherein said third layer is not coextensive with said first layer.

4. A blown-film textured liner according to claim 1, wherein said second layer is not coextensive with said first layer wherein a portion of said upper flat surface of said first layer is exposed and wherein said third layer is not coextensive with said first layer wherein a portion of said lower flat surface of said first layer is exposed.

5. A blown-film textured liner according to claim 4, wherein said exposed portion of said upper flat surface of said first layer is aligned with said exposed portion of said lower flat surface of said first layer.

6. A blown-film textured liner according to claim 1, wherein said first layer, said second layer and said third layer comprise a thermoplastic material selected from the group consisting of high density polyethylene, linear low density polyethylene, very low density polyethylene and elastomeric polypropylene.

7. A blown-film textured liner according to claim 1, having a thickness ranging from 20 to 100 mils.

* * * * *